United States Patent [19]

Nomura et al.

[11] Patent Number: 5,588,748
[45] Date of Patent: Dec. 31, 1996

[54] PROBE COVER FOR USE IN TYMPANIC THERMOMETER

[75] Inventors: Toshiyuki Nomura; Yuiji Tsujioka; Naohiro Osuga, all of Miyanohigashi-machi, Japan

[73] Assignee: Horiba, Ltd., Kyoto, Japan

[21] Appl. No.: 668,517

[22] Filed: Jun. 28, 1996

Related U.S. Application Data

[63] Continuation of Ser. No. 501,696, Jul. 12, 1995, abandoned, which is a continuation of Ser. No. 121,361, Sep. 14, 1993, abandoned.

[30] Foreign Application Priority Data

Sep. 19, 1992 [JP] Japan ................................ 4-275543

[51] Int. Cl.⁶ ...................................... G01K 1/08
[52] U.S. Cl. ...................... 374/158; 128/664; 128/736
[58] Field of Search ................................ 374/158, 209; 206/306; 128/664, 736

[56] References Cited

U.S. PATENT DOCUMENTS

| | | | |
|---|---|---|---|
| Re. 34,599 | 5/1994 | Suszynski et al. | 206/306 |
| 3,301,394 | 1/1967 | Baermann et al. | 206/306 |
| 3,469,685 | 9/1969 | Baermann . | |
| 3,833,115 | 9/1974 | Schapker | 374/158 |
| 4,241,828 | 12/1980 | Bourdelle et al. | 206/306 |
| 4,652,145 | 3/1987 | Björnberg | 374/158 |
| 4,911,559 | 3/1990 | Meyst et al. | 374/158 |
| 5,018,872 | 5/1991 | Suszynski et al. | 128/664 |
| 5,088,834 | 2/1992 | Howe et al. | 374/158 |
| 5,179,936 | 1/1993 | O'Hara et al. | 374/158 |
| 5,188,459 | 2/1993 | Mino et al. | 374/158 |

FOREIGN PATENT DOCUMENTS 0445784  9/1991  European Pat. Off. .

*Primary Examiner*—Diego F. F. Gutierrez
*Attorney, Agent, or Firm*—Poms, Smith, Lande and Rose

[57] ABSTRACT

A probe cover for covering the probe of a tympanic thermometer. The cover includes a film member for covering a probe and a flexible retaining member having an opening for allowing passage of the probe therethrough.

17 Claims, 3 Drawing Sheets

PROBE COVER FOR USE IN TYMPANIC THERMOMETER

This application is a continuation of U.S. paetnt application Ser. No. 08/501,696, filed Jul. 12, 1995, now abandoned, which is a continuation of application Ser. No. 08/121,361, filed Sep. 14, 1993, now abandoned.

BACKGROUND OF THE INVENTION

1. Field of the Invention

The present invention relates to a disposable probe cover used in a tympanic thermometer utilizing an infrared thermometer.

2. Description of the Prior Art

The so-called contact-type clinical thermometer has been widely used as means for measuring the body heat of the human body. Recently, however, a tympanic thermometer utilizing an infrared thermometer has been used in place of said clinical thermometer. This tympanic thermometer is adapted to insert a probe provided with a speculum into an ear hole and detect infrared rays from an eardrum and the external ear passage by means of a sensor. Body heat is measured on the basis of the quantity of infrared rays. The body heat can be measured within about 3 seconds.

With the above-described thermometers, the contact between the thermometer and the body must be sanitary. In particular, the above-described tympanic thermometer is adapted to insert a probe into the ear hole. The speculum, which transmits infrared rays, must not be soiled and broken with ear wax and the like. Because, if ear wax and the like adhere to the speculum formed at a front end of the probe or within the probe, the quantity of transmitted infrared rays is reduced or fluctuates to make accurate measurement of temperature difficult.

So, in the above-described tympanic thermometer, a disposable probe cover has been put on the probe in order to protect the speculum. FIG. 8 shows the conventional probe cover. A probe cover 30 shown in FIG. 8(A) comprises a cover member 31 made of polyethylene (PE) and a PE film 32 thermally welded to a front end of the cover member 31 (refer to, for example, Japanese Patent Application Laid-Open No. Sho 61-263438). In addition, a probe cover 40 shown in FIG. 8(B) comprises a frame member 41 made of PE and the like and a PE film 42, which is formed in a bag shape so that a front end portion thereof may be flattened as far as possible. The film 42 is thermally welded to the frame member 41 (refer to, for example, Japanese Patent Application Laid-Open No. Hei 3-133425).

However, the above-described conventional probe covers are bulky and require a housing case appropriately large enough to accommodate each.

So, a probe cover including a film member attached to a pasteboard having an opening for passing a probe therethrough is contemplated, so that four corners thereof are temporarily mounted. The pasteboard is placed on an installing table with the film member as an upper surface the probe is inserted into opening to put the film member on the probe. The temporary mounting of the film member on the pasteboard is canceled.

However, in this case there are problems in that it is difficult to simultaneously and uniformly cancel the temporary mounting at four corners, and adhesives for the temporary mounting are often carelessly adhered.

SUMMARY OF THE INVENTION

The present invention has been achieved in view of such actual circumstance, and it is an object of the present invention to provide a clean probe cover for use in a tympanic thermometer which is capable of easily and surely covering a probe, but which is not bulky.

In order to achieve the above-described objects, a probe cover, according to the present invention has the following construction.

A first embodiment of the present invention include a film member for covering a probe of a tympanic thermometer that is put on a flexible retaining member, such as a cardboard sheet, with an opening for passing the probe therethrough. The film member and the retaining member are adhered to each other at their end edge portions.

A second embodiment is characterized in that a film member for covering a probe of a tympanic thermometer is put on a flexible retaining member formed cross-radially with an opening for passing the probe therethrough. They are adhered to each other at four points of their respective radial end edge portions.

A third embodiment is characterized in that a film member for covering a probe of a tympanic thermometer is put on a flexible retaining member formed radially in three directions with an opening for passing the probe therethrough. They are adhered to each other at three points of their respective radial end edge portions.

A fourth embodiment is characterized in that a film member for covering a probe of a tympanic thermometer is put on a flexible retaining member formed in a seed leaf-shaped form extending radially in two directions with an opening for passing the probe therethrough. They are adhered to each other at two points of their respective radial end edge portions.

A fifth embodiment is characterized in that the film member is transparent and the retaining member is colored.

According to said first embodiment, upon placing a probe cover for use in a tympanic thermometer on an installing table with the film member as an upper surface and inserting the probe through the opening opened at the center of the retaining member the probe may be pushed through the opening of the retaining member downward and covered by the film member. The end edge portions of the retaining member are pulled by the film member and bent inward. The probe is tightly engaged in the opening of the retaining member such that the probe is stably covered with the film member.

Since the end edge portions of the retaining member are bent inward when the probe is covered with the film member in the above-described manner, the probe can be visually confirmed and easily inserted into the ear hole.

In addition, the probe cover can be easily removed from the probe by a repelling power due to the flexibility of the retaining member.

According to the second embodiment, the retaining member is formed cross-radially and thus the same flexibility can be kept when the thickness of the retaining member is increased, According to the third embodiment, since the retaining member is formed radially in three directions, the probe cover can be more easily bent.

According to the fourth embodiment, since the retaining member is formed in a seed leaf-shaped form extending in two directions, the members can be saved.

According to the fifth embodiment, since the retaining member is colored, the discrimination of the front side from the back side and the confirmation of the opening can be easily achieved.

DETAILED DESCRIPTION OF THE PREFERRED EMBODIMENTS

The preferred embodiments of the present invention will be described below in detail with reference to the drawings.

Figure 1:
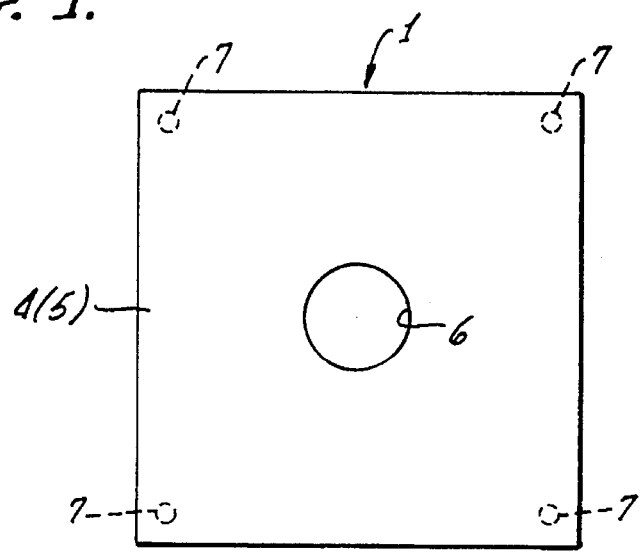
FIG. 1 is a plan view showing one preferred embodiment of a probe cover for use in a tympanic thermometer according to the invention.
Figure 2:
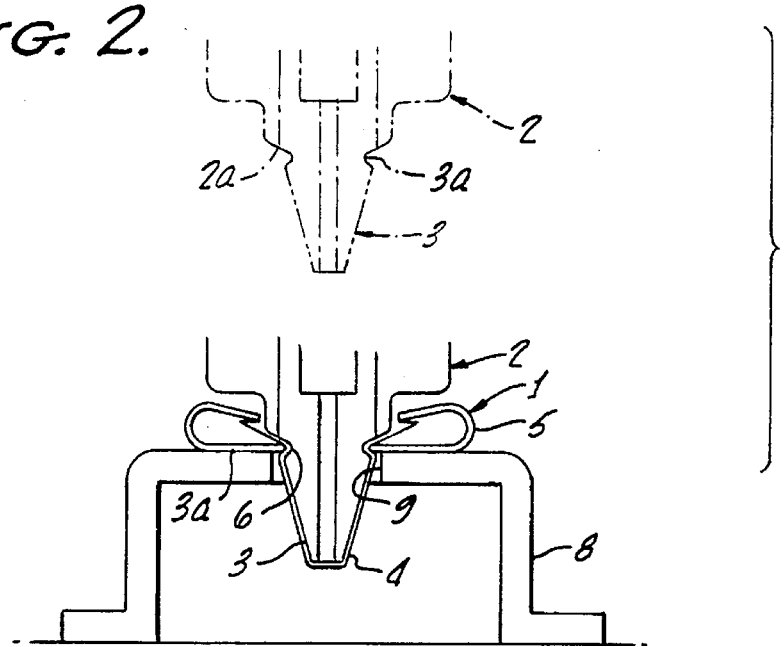
FIG. 2 is a diagram showing the use of one preferred embodiment of the probe cover for use in a tympanic thermometer.

FIG. 1 shows a first preferred embodiment. Referring to FIG. 1, in a probe cover (1) for use in a tympanic thermometer 2 (hereinafter referred to as probe cover), a film member 4 for covering a probe 3 of a tympanic thermometer 2 (refer to FIG. 2) is put on a flexible retaining member 5, such as a cardboard or plastic sheet, with an opening 6 at the center thereof for passing the probe 3 therethrough, end edge portions, and midportions defined between the opening 6 and a respective end edge portion. The film member 4 and retaining member 5 are thermally welded; to each other at four points 7 to form a regular square shape.

The film member 4 is made of a transparent polyethylene film, such as polypropylene film and the like, superior in infrared transmissivity, having a thickness of about 10 to 20 μm the retaining member 5 is made of the same materials as the film member 4 but colored and having a thickness of about 100 to 200 μm so that an assembly may not be bulky but thin when they are put one upon another. Since the retaining member 5 is colored, the position of opening 6 and the front side or the back side can be clearly confirmed.

In order to place the probe cover 1 on the probe 3 of the tympanic thermometer 2 (refer to FIG. 2), the probe cover 1 is placed on an installing table 8 provided with a receiving hole 9 for passing the probe 3 therethrough with the receiving hole 9 corresponding to the opening 6 and the film member 4 facing upwardly, whereby the probe cover 1 is in a first position with the retaining member 5 substantially planar (as illustrated in, e.g., FIG. 1). The probe 3 may be inserted into the opening 6 from above and pushed down until the probe 3 has fallen through the opening 6 of retaining member 5 and covered with the film member 4. The four points 7 of the end edge portions of the retaining member 5 are pulled by the film member 4 and bent inward to form a circumferential groove 3a in a base portion of the probe 3, which is tightly engaged in the opening 6 of the retaining member 5, whereby the probe cover 1 is in a second position with the retaining member 5 bent at the mid-portions such that the midportions are substantially curved (as illustrated in, e.g., FIG. 2). Thus, the probe 3 is covered with the film member 4 and the covered condition can be stably kept by means of the retaining member 5. When the probe 3 is pulled up, the covered condition is kept as it is and temperature can be measured.

Figure 3:
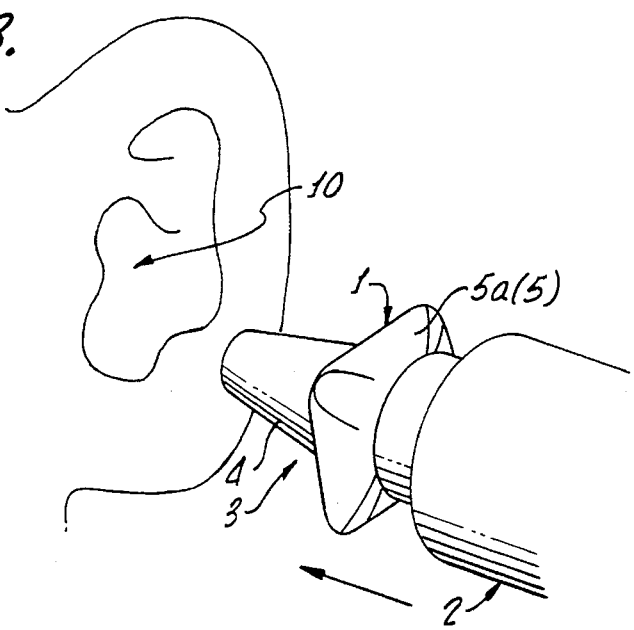
FIG. 3 is a diagram showing the insertion of one preferred embodiment of the probe cover for use in a tympanic thermometer into an ear hole.

Since the respective end edges of the regular square retaining member 5 are bent inward under the condition that the probe 3 is covered with the film member 4 in the above-described manner, the probe 3 can be visually confirmed and easily inserted into an ear hole 10, as illustrated in FIG. 3.

Since the probe 3 is covered with the film member 4 under the condition that the probe 3 is inserted into the ear hole 10, the probe 3 is not brought into immediate contact with the ear hole 10 and is kept clean. As a result, the body heat can be measured immediately after introducing infrared rays into the probe 3 through the film member 4. Accordingly, the clean measurement of the body heat can be always carried out efficiently by exchanging the film member 4 every time. In addition, in order to remove the probe cover 1, a circular receiving seat 2a put on the probe 3 is pushed out by operating a lever or the like (not shown). At this time, since the retaining member of the probe cover is flexible, the probe cover 1 can be simply removed by the repelling power imparted by the lever.

Figure 4:
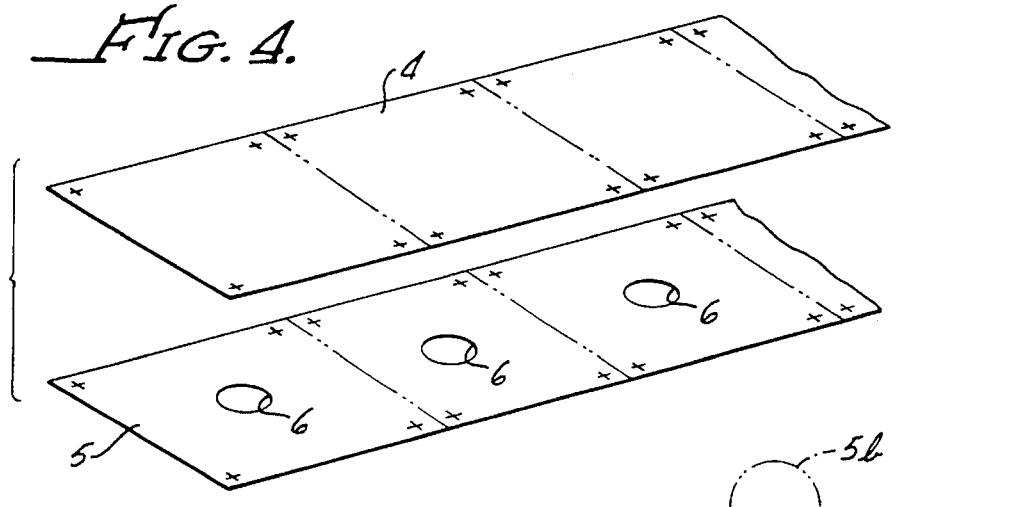
FIG. 4 is a diagram showing the manufacturing steps of one preferred embodiment of the invention.

The probe cover 1 can be easily produced as illustrated in FIG. 4 by putting the band-shaped film member 4 upon the band-shaped retaining member 5, provided with the opening 6, formed at regular intervals, and thermally welding them to each other at places marked with an followed by cutting at places shown by two-dot chain lines. In addition, perforations may be formed at the places shown by the two-dot chain lines to make the separation easy.

Figure 5:
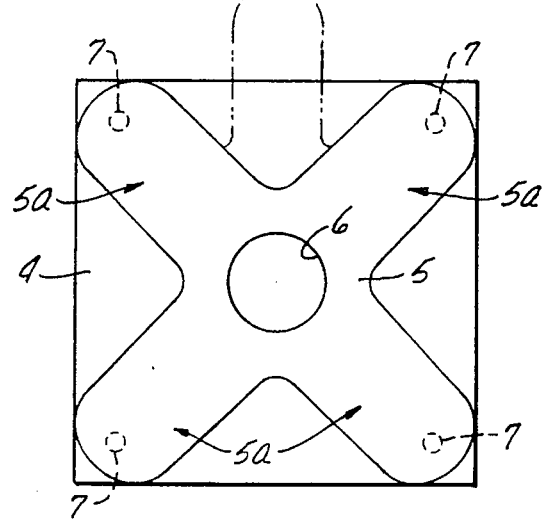
FIG. 5 is a plan view showing a second preferred embodiment of a probe cover for use in a tympanic thermometer

FIG. 5 shows a second preferred embodiment in which the retaining member 5 is formed in a four-leaf shape extending cross-radially to be easily bent at branched portions 5a, thereby improving bendability. In addition, if a thickness of, for example, about 200 μm is given to the retaining member 5, the circumferential groove 3a of the probe 3 can be more stably and tightly engaged in the opening 6 and the probe 3 can be covered with the film member 4 with a sufficient tension. In addition, the retaining member 5 may be provided with a holding portion 5b protruded therefrom, as shown in a two-dot chain line, so that the probe 3 may be installed without contacting the film member 4.

Figure 6:
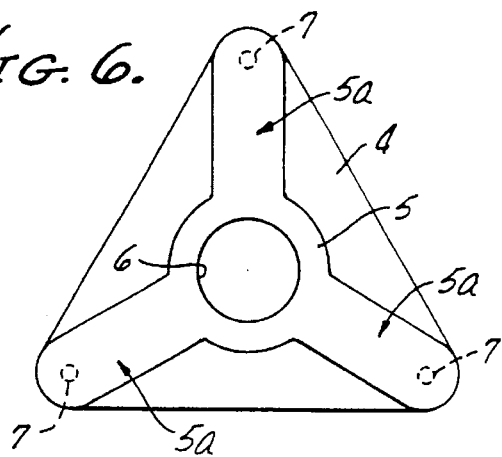
FIG. 6 is a plan view showing a third preferred embodiment of a probe cover for use in a tympanic thermometer.

FIG. 6 shows a third preferred embodiment in which the retaining member 5 is formed in a honewort shape extending radially in three directions to be still more easily bent. In addition, in this case, the film member 4 is formed in a regular triangle shape.

Figure 7:
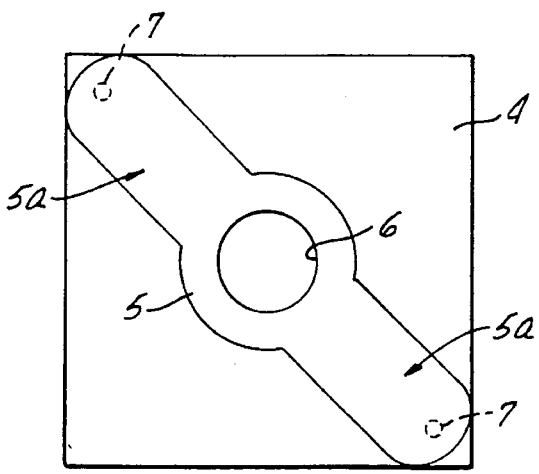
FIG. 7 is a plan view showing a fourth preferred embodiment of a probe cover for use in a tympanic thermometer.
Figure 8A:
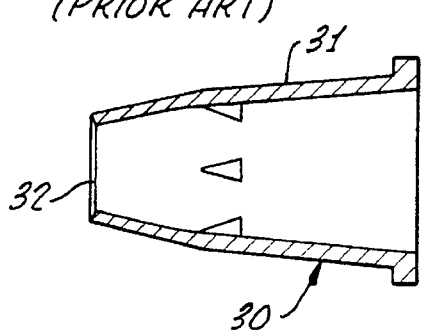
FIG. 8(A) is a sectional view showing one example of the conventional probe cover and FIG. 8(B) is a sectional view showing another example of the conventional probe cover.
Figure 8B:
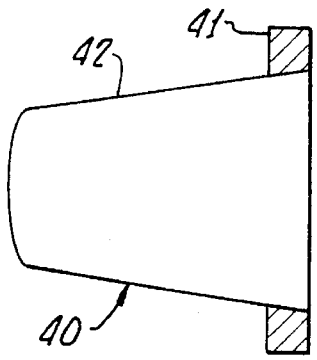

FIG. 7 shows a fourth preferred embodiment in which the retaining member 5 is formed in a seed leaf-shaped form extending in two directions to reduce the number of members and reduce the cost.

In addition, it goes without saying that the retaining member 5 may be made of papers and the like and flexible thin materials can be suitably used for the retaining member 5 in the above-described respective preferred embodiments.

As above described, according to the invention, since the film member for covering the probe of the tympanic thermometer is put on the flexible retaining member with the opening for passing the probe therethrough, the cover is not bulky, and, during installation, the probe can be tightly engaged in the opening of the retaining member so that the probe is stably covered with the film member. Since the respective end edges of the retaining member are bent inward under the condition that the probe is covered with the film member, the probe can be visually confirmed and easily inserted into the ear hole. And, when the probe is to be inserted into the ear hole, the film member is adhered to the retaining member and thus the clean measurement of body heat can be achieved without soiling the ear hole with adhesives by exchanging the probe every time.

According to the second embodiment of the invention, the retaining member is formed cross-radially and thus not only the flexibility can be increased to improve the installing workability and the thickness of the retaining board can be increased.

According to the third embodiment of the invention, since the retaining member is formed radially in three directions, the probe cover can be more easily bent and thus the installing workability can be improved.

According to the fourth embodiment of the invention, since the retaining member is formed in a seed leaf-shaped form extending in two directions, the number of members can be saved and thus the cost can be reduced.

According to the fifth embodiment of the invention, since the retaining member is colored, the discrimination of the front side from the back side and the confirmation of the opening can be easily conducted and thus the handling for the installation can be made easy.

What is claimed is:

1. A probe cover for use with a thermometer having an elongate probe, the probe defining a receiving groove at its base, the probe cover comprising:

a retaining member having at least two end edge portions, a substantially centrally located opening, the opening being dimensioned to admit the elongate probe and to engage the receiving groove, and at least two mid-portions, the mid-portions being located between the opening and a respective end edge portion, the end edge portions being movable between a first position whereby the retaining member is substantially planar and a second position whereby the retaining member is bent inward toward the opening at the mid-portions; and a film member secured to the retaining member at the end edge portions, the film member covering the opening;

the film member contacting the probe and being urged through the opening of the retaining member by the probe when the probe cover is urged over the probe, thereby drawing the end edge portions of the retaining member inwardly toward the opening and into the second position.

2. The probe cover of claim 1 wherein the film member is transparent to infrared radiation.

3. The probe cover of claim 2 wherein the film member is a sheet of polyethylene.

4. The probe cover of claim 2 wherein the film member is a sheet of polypropylene.

5. The probe cover of claim 1 wherein the film member has a thickness of about 10 to 20 μm.

6. The probe cover of claim 1 wherein said retaining member has a thickness of about 100 to 200 μm.

7. The probe cover of claim 6 wherein said retaining member is formed of paper.

8. The probe cover of claim 6 wherein said retaining member is formed of cardboard.

9. The probe cover of claim 6 wherein said retaining member is formed of polyethylene.

10. The probe cover of claim 6 wherein said retaining member is formed of polypropylene.

11. The probe cover of claim 1 wherein said retaining member is colored.

12. The probe cover of claim 1 wherein said retaining member is provided with four mutually opposed end edge portions.

13. The probe cover of claim 12 wherein said retaining member defines a regular square shape.

14. The probe cover of claim 1 wherein said retaining member is provided with three mutually opposed end edge portions.

15. A probe cover as claimed in claim 1, wherein the mid-portions are substantially curved when the end edge portions are in the second position.

16. A probe cover as claimed in claim 1, wherein the end edge portions define mutually opposite corners of the retaining member, the film member being secured to the retaining member at the mutually opposite corners thereof.

17. A probe cover for use with a thermometer having an elongate probe, the probe defining a receiving groove at its base, the probe cover comprising:

a flexible retaining member having at least two end edge portions and a substantially centrally located opening, the opening being dimensioned to admit the elongate probe and to engage the receiving groove; and a film member secured to the retaining member at the end edge portions, the film member covering the opening;

the film member contacting the probe and being urged through the opening of the retaining member by the probe when the probe cover is urged over the probe, thereby drawing the end edge portions of the retaining member inwardly toward the opening.

* * * * *